3,433,779
LONG-CHAIN ALIPHATIC ESTERS OF LYSINE
AND OTHER BASIC AMINO ACIDS AND
PEPTIDES THEREOF
Karl Vogler, Riehen, Switzerland, assignor to Hoffmann-La Roche Inc., Nutley, N.J., a corporation of New Jersey
No Drawing. Filed Sept. 25, 1964, Ser. No. 399,329
Claims priority, application Switzerland, Oct. 14, 1963, 12,600/63
U.S. Cl. 260—112.5
Int. Cl. C07c 101/24, 103/52; A61k 27/00
5 Claims The present invention relates to novel compounds, methods and intermediates useful in their preparation, and uses therefor. The novel compounds of this invention are long chain aliphatic acid esters of amino carboxylic acids. More particularly, the novel compounds of this invention are of the formula:

wherein R is an aliphatic hydrocarbon moiety containing at least 8 carbon atoms and Ac is selected from the group consisting of the acyl residue of a basic α-amino monocarboxylic acid and an acyl residue of a di- or tri-peptide, containing at least one basic α-amino monocarboxylic acid moiety; and acid-addition salts thereof.

The aliphatic hydrocarbon moiety containing at least 8 carbon atoms, which is represented by the symbol R, can be straight or branched chain, saturated or unsaturated. Said aliphatic hydrocarbon moiety preferably has a chain length of from 10 to 20 carbon atoms. Especially preferred are those having a chain length of from 10 to 16 carbon atoms. Exemplary of preferred aliphatic hydrocarbon moieties defined by R are the following long chain alkyl groups: n-octyl, n-decyl, n-dodecyl, n-octadecyl, n-eicosyl, n-tetradecyl and n-hexadecyl; with the latter two being especially preferred.

As stated above, the symbol Ac represents members selected from the group consisting of the acyl residue of a basic α-amino monocarboxylic acid and an acyl residue of a di- or tri-peptide, containing at least one basic α-amino monocarboxylic acid moiety. The term "the acyl residue of a basic α-amino monocarboxylic acid," as used in the above definition, comprehends acyl residues of α-amino monocarboxylic acids which, in addition to the α-amino group, contain at least one further basic group such as, for example, an imino group, an amino group or a guanidino group. Thus, preferred as the acyl residue of basic α-amino monocarboxylic acids are moieties of the formula:

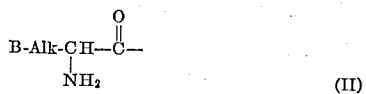

wherein the symbol "Alk" is lower alkylene and B is a basic moiety selected from the group consisting of amino, imino and guanidino.

Exemplary of α-amino monocarboxylic acid moieties of Formula II wherein B is amino, are moieties of acids such as diamino monocarboxylic acids, esp. amino-(α-amino)-lower alkanoic acids such as α,β-diaminopropionic acid, α,γ-diaminobutyric acid, ornithine, lysine and the like. Exemplary of α-amino monocarboxylic acid moieties of Formula II wherein B is imino are moieties of acids containing imino groups such as the imidazol-5-yl group, for example, histidine and the like. Moreover, exemplary of α-amino monocarboxylic acids of Formula II wherein B is guanidino are moieties of acids such as guanidino-(α-amino)-lower alkanoic acids, for example, arginine and the like. Especially preferred α-amino monocarboxylic acid moieties are moieties of naturally occurring α-amino monocarboxylic acids, i.e., those basic amino acids which are the component acids of proteins.

The basic α-amino monocarboxylic acid moieties can be present in racemic (D,L) or optically active (D- or L-) form. Preferred are moieties of naturally occurring α-amino monocarboxylic acids having the L-configuration.

Preferred compounds of Formula I wherein Ac is the acyl residue of a basic α-amino monocarboxylic acid are, for example, L-lysine-n-octyl ester, L-ornithine-n-dodecyl ester, L-lysine-n-decyl ester, L-lysine-n-tetradecyl ester and L-lysine-n-hexadecyl ester.

Compounds of Formula I which are esters of basic dipeptides, i.e., compounds of Formula I wherein Ac is the acyl residue of a dipeptide containing at least one basic α-amino monocarboxylic acid moiety, form a second group of novel compounds within the scope of the present invention. Exemplary of dipeptide moieties represented by Ac in Formula I are such dipeptide moieties as seryl-lysine, lysyl-serine, lysyl-lysine, and the like. As stated above, at least one of the amino acid moieties of the dipeptide group must be that of a basic α-amino monocarboxylic acid. The second amino acid moiety in the dipeptide chain can be the moiety of either a neutral α-amino monocarboxylic acid or can be the moiety of a basic α-amino monocarboxylic acid. Exemplary of neutral α-amino monocarboxylic acid moieties are those of neutral naturally occurring (i.e., component acids of proteins) α-amino acids, such as alanine, phenylalanine, cysteine, cystine, methionine, glycine, leucine, isoleucine, valine, norvaline, proline, serine, threonine and tyrosine. Such neutral amino acid moieties having an asymmetric center, can be used not only in their racemic (D,L) form but also in their optically active (D- or L-) form. Cystine, though not a monocarboxylic acid, is classed in the above group, since it contains an α-amino group for each carboxylic acid moiety, and moreover, it is conventionally classed as a neutral naturally occurring amino acid.

Dipeptides synthesized from one neutral and one basic α-amino monocarboxylic acid can be classed in two subgroups, the first being those dipeptides in which the terminal carboxyl function forms part of the moiety of the neutral α-amino monocarboxylic acid (such as, for example, in lysyl-serine). The second sub-groups are those dipeptides in which the terminal carboxyl function is part of the basic α-amino monocarboxylic acid moiety (such as, for example, in seryl-lysine). The latter classes can be further subdivided, i.e., into those dipeptides which are linked in an α-amide fashion and those which are linked in an ω-amide fashion; exemplified by N$^\alpha$-seryl-lysine and N$^\epsilon$-seryl-lysine, respectively. Similarly, dipeptides containing two basic α-amino monocarboxylic acd moieties can be subgrouped according to the latter differentiation, i.e., as to whether the peptide linkage is α-amide or ω-amide, exemplified by N$^\alpha$-lysyl-lysine and N$^\epsilon$-lysyl-lysine, respectively.

Exemplary compounds of Formula I wherein Ac is the acyl residue of a dipeptide containing at least one basic α-amino monocarboxylic acid moiety are compounds such as: N$^\alpha$-L-arginyl-L-arginine-n-hexadecyl ester, N$^\alpha$-D-seryl-L-lysine-n-hexadecyl ester, N$^\epsilon$-L-phenyl-alanyl-L-lysine-n-tetradecyl ester, L-lysyl-L-phenylalanine-n-hexadecyl ester and N$^\alpha$-L-lysyl-L-lysine-n-dodecyl ester.

For the sake of simplicity, the α-amide linkage is not always specifically denoted in this text. Accordingly, in the di- and tri-peptide moieties discussed herein (i.e., in the examples as well as in the descriptive part) the linkage is in the α-amide fashion, unless specified otherwise.

A third group of compounds of this invention are compounds of Formula I wherein Ac is the acyl residue of a tripeptide containing at least one basic α-amino monocarboxylic acid moiety. Such compounds of Formula I can be sub-grouped according to the makeup of the tripeptide moiety along the same lines as discussed above for the compounds of Formula I containing a dipeptide moiety. For example, besides one basic α-amino monocarboxylic acid moiety, the second and third α-amino monocarboxylic acid moieties can each be derived from either a basic or a neutral α-amino monocarboxylic acid. Furthermore, the various tripeptide moieties can be differentiated into subgroups according to whether the esterified carboxy group is part of a basic α-amino monocarboxylic acid moiety or part of a neutral α-amino monocarboxylic acid moiety. Moreover, the tripeptide moieties are to be distinguished according to whether the peptide linkages are α-amide and/or ω-amide linkages. Thus, as is apparent, the number of sub-groups of compounds of Formula I containing a tripeptide moiety is even greater than the number of sub-groups of compounds of Formula I containing a dipeptide moiety.

Exemplary compounds of Formula I containing a tripeptide moiety are L-lysyl-L-lysyl-L-lysine-n-hexadecyl ester, $N^\alpha$-L-lysyl-($N^\epsilon$-L-lysyl)-L-lysine-n-tetradecyl ester and glycyl-L-lysyl-L-lysine-n-dodecyl ester.

In one embodiment of this invention, a compound of Formula I is prepared by a process which comprises esterifying a compound of the formula:

wherein Ac has the same meaning as above, or a reactive derivative thereof, with an alcohol of the formula:

wherein R has the same meaning as above, or a reactive derivative thereof.

In another embodiment of this invention, compounds of Formula I wherein Ac is a di- or tri-peptide moiety can be prepared via acylation wherein an ester of the formula:

wherein $Ac^1$ is the acyl residue of a neutral or basic α-amino monocarboxylic acid or of a dipeptide, the components of which are neutral or basic α-amino monocarboxylic acid moieties, and R has the same meaning as above, is treated with a compound of the formula

or with a reactive derivative thereof, wherein $Ac^2$ is an acyl moiety of neutral or basic α-amino monocarboxylic acid or the acyl moiety of a dipeptide, the components of which are neutral or basic α-amino monocarboxylic acid moieties; and wherein at least one of $Ac^1$ and $Ac^2$ contains at least one basic α-amino monocarboxylic acid moiety. Thus, as outlined above, all compounds of Formula I, i.e., not only the esters of the amino acids but also the esters of the di- and tri-peptides, can be prepared by esterification of the corresponding unesterified compounds. Moreover, the di- and tri-peptide esters can be obtained from amino monocarboxylic acid and dipeptide esters by lengthening the chain thereof with one or two amino acid residues by means of N-acylation.

The preparation of a compound of Formula I by esterification of a corresponding unesterified starting compound can be effected by conventional esterification means according to known methods. Thus, for example, an N-protected basic α-amino monocarboxylic acid or an N-protected di- or tri-peptide of Formula III containing the moiety of at least one basic α-amino monocarboxylic acid can be reacted in the presence of a tertiary base (such as a tri-lower alkylamine, e.g, triethylamine) with a reactive derivative of an alcohol of Formula IV. The halogenides (e.g., the chlorides, bromides or iodides) are especially suitable as reactive derivatives of the alcohols of Formula IV.

The free amino group of the starting material compounds can be protected with the usual protecting groups, conventional in peptide synthesis. Such N-protecting groups are, for example, carbobenzoxy, tosyl, phthalyl, trityl, formyl, trifluoroacetyl, tert. butyloxycarbonyl and the like. Also, as is conventional, the nitro group can be utilized as the protecting group for the guanidino group of arginine. The solvent or reaction medium in which the esterification of this invention can be conducted are suitably organic compounds conventionally used as solvents and inert to the reactants, for example ethers such as dioxane, di-lower alkyl formamides, such as dimethylformamide, and the like. The reaction can conveniently be effected at elevated temperatures, for example at the reflux temperature of the reaction medium. For example, the n-hexadecyl ester of L-lysine can be prepared by heating to boiling under reflux, a solution of $N^\alpha,N^\epsilon$-dicarbobenzoxy-lysine in dioxane in the presence of triethylamine, together with approximately one mole equivalent of 1-bromohexadecane, and subsequently removing both of the carbobenzoxy protecting groups by hydrogenolysis. Esterified di- or tri-peptides of Formula I can be prepared in the corresponding manner, for example L-lysyl-L-lysine or L-lysyl-L-lysyl-L-lysine can be esterified in a corresponding manner by reacting the peptide (with prior protection of the amino groups) with a long chain alkyl or alkenyl halogenide, and subsequently splitting off the protecting groups.

The esterification reaction can also be effected by reacting reactive derivatives of the acids of Formula III with a long chain alcohol of Formula IV. Thus, for example, the anhydride or a mixed anhydride of an acid of Formula III (suitably with protected amino groups) can be reacted with a long chain alcohol (such as cetyl alcohol).

Moreover, the esterification can also be effected by the acid catalyzed reaction of an acid of Formula III with an alcohol of Formula IV. Exemplary of suitable acid catalysts is, for example, p-toluenesulfonic acid. For the purposes of such acid catalyzed esterification, it is not necessary to protect the amino groups in the starting material compounds.

In addition to the esterification reactions above-described, the long chain esters of dipeptides can also be prepared from long chain esters of basic or neutral α-amino monocarboxylic acids by α- or ω-amide combining with a second α-amino monocarboxylic acid. Starting from a long chain ester of a basic α-amino monocarboxylic acid (such as the n-dodecyl ester of ornithine), then the second α-amino monocarboxylic acid moiety inserted by the peptide synthesis can be either a basic or a neutral α-amino monocarboxylic acid (such as, for example, ornithine or threonine). On the other hand, starting from a long chain ester of a neutral α-amino monocarboxylic acid (such as, for example, a leucine ester) then a basic α-amino monocarboxylic acid must be used as the second amino acid moiety in order to prepare dipeptides of this invention (i.e. of Formula I).

The syntheses of dipeptide esters from the corresponding esters of α-amino monocarboxylic acids can be effected by means of methods conventional in peptide chemistry (i.e., by N-acylation of α-amino monocarboxylic acid esters with a compound which gives the desired α-amino monocarboxylic acid moiety). Thus, for example, an α-amino monocarboxylic acid can be reacted with a long chain ester of an α-amnio monocarboxylic acid in the presence of a suitable condensation agent (such as a carbodiimide, for example, dicyclohexylcarbodiimide or carbonyldiimidazole or 2 - ethyl - 5 - m-sulfonato-phenylisoxazole, or the like). The reaction is preferably effected at a low temperature, for example, in the range of about 0–20° C. in the presence of a solvent such as dimethylformamide, chloroform, methylene chloride, ethyl acetate, tetrahydrofuran or the like. Moreover, for the purposes of this reaction, the acylation of the preexisting ester component can be effected by using as the acylating agent, an α-amino monocarboxylic acid which is modified in the carboxyl group, for example, an oxide, a halogenide (such as the chloride), an activated ester (such as the p-nitrophenyl ester, the thiophenyl ester or the cyanomethyl ester), a mixed anhydride with an inorganic acid (such as carbonic acid, sulfuric acid, or phosphoric acid), or the like. The reaction can be effected at or below room temperature.

One method of forming the dipeptide chain which not only utilizes an acylating agent possessing an activated carboxyl group, but also an ester component containing an activated amino group, is the method of Anderson (J. Am. Chem. Soc. 74 (1952), 5304 and 5309) in which the carboxyl group is converted into a —COOP($OC_2H_5$)$_2$ group and the amino group into a —NHP($OC_2H_5$)$_2$ group by means of tetraethylpyrophosphite [i.e., $$(C_2H_5O)_2{=}POP{=}(OC_2H_5)_2]$$

Esters of basic α-amino monocarboxylic acids, such as the α,ω-diamino-monocarboxylic acids can be acylated at the α- and/or ω-amino groups. Selective acylation at the $N^α$- or $N^ω$-position can be effected by blocking the ω- or α-amino group, respectively. Suitable for the blocking of such amino groups are the protecting groups already mentioned above, such as the carbobenzoxy or formyl group. If neither of the two amino groups of the basic ester component group is protected there can thus be obtained $N^α,N^ω$-diacyl derivatives (i.e, tripeptide esters).

Long chain esters of tripeptides can be obtained by the process described immediately above, and also by condensation of an α-amino monocarboxylic acid ester with a dipeptide or by condensation of a dipeptide ester with an α-amino monocarboxylic acid. Thus, for example the n-decyl ester of lysyl-lysyl-lysine can be obtained by acylating the $N^ε$-protected n-decyl ester of lysine with lysyl-lysine azide, all the amino groups of which are protected, and subsequently splitting off said protecting groups. Alternatively, the same tripeptide ester can also be prepared by $N^α$-acylation of lysyl-lysine n-decyl ester, the ε-amino groups of which are protected, with lysine (the amino group of which may be protected), and then subsequently splitting off all protecting groups.

The various protecting groups discussed above can be split off according to methods conventional in the art. After having effected esterification or N-acylation, for example, the protecting groups can be split off by hydrogenolysis or hydrolysis. Thus, the carbobenzoxy protecting group can be split off by means of catalytically activated hydrogen, for example by using palladium as the catalyst, or by means of HBr/glacial acetic acid. The formyl protecting group can be split off with mineral acids at low temperatures. Other protecting groups can similarly be split off by methods known in the art.

The products of Formula I, obtained according to the above described processes, which are obtained as bases, can be converted into acid-addition salts by methods known per se. Moreover, bases of Formula I can be liberated from such acid-addition salts according to methods known per se, and, if desired, the so-liberated bases can be converted into other acid-addition salts. Thus, bases of Formula I form acid-addition salts with both inorganic and organic acids, for example sulfuric acid, phosphoric acid, hydrohalic acid (such as hydrochloric acid, hydrobromic acid), oxalic acid, acetic acid, citric acid, tartaric acid, sorbic acid, p-toluenesulfonic acid, and the like.

The compounds of Formula I, including acid-addition salts thereof, are useful as disinfectants and bactericidal agents. Thus, the compounds of Formula I and the acid-addition salts thereof have a high antibacterial activity against gram-positive bacteria (such as *Pneumococci, Streptocci, Anthrax bacilli, Staphylococci, Enterococci*) and gram-negative bacteria (such as *Escherichia coli, Salmonella typhi murium, Shigella, Klebsiella pneumoniae* as well as, in particular, *pseudomonas aeruginosa*). Moreover, the compounds of Formula I, as well as their acid-addition salts, are characterized by a very low level of toxicity. Such compounds can, for example, be used as disinfectants for rooms, apparatus and utensils in dairy farms.

The following compounds, among others, show a particularly high antibacterial activity: L-lysine-n-decyl ester, L-lysine-n-dodecyl ester, L-lysine-n-tetradecyl ester and their acid-addition salts.

The novel compounds of Formula I, as well as their acid-addition salts, can be used as medicaments in the form, for example, of pharmaceutical preparations containing a compound of Formula I or a pharmaceutically acceptable acid-addition salt thereof in admixture with a pharmaceutical organic or inorganic pharmaceutical carrier suitable for enteral or parenteral administration, such as, for example, water, gelatin, lactose, starch, magnesium stearate, talc, vegetable oils, gums, polyalkylene glycols, Vaseline, etc. Moreover, they can be submitted to conventional pharmaceutical expedients such as sterilization. Also, the pharmaceutical preparations can be administered in conventional solid forms, e.g., tablets, dragees, suppositories, capsules, or the like, or in conventional liquid forms, e.g., solutions, suspensions or emulsions; and can contain additive materials such as preserving, stabilizing, wetting or emulsifying agents, salts for the adjustment of osmotic pressure, or buffers. Furthermore, they can contain other therapeutically active materials. For non-pharmaceutical uses, such as for room disinfection, a compound of Formula I or an acid-addition salt thereof (which, of course, need not be pharmaceutically acceptable) can be used by merely dissolving or suspending an amount thereof sufficient to exhibit an antibacterial effect in a suitable liquid carrier, for example, water, ethanol, or the like.

The following examples are illustrative, but not limitative of this invention. All temperatures are stated in °C. The symbol Z represents the carbobenzoxy group.

Example 1

41.4 g. $N^α$-Z($N^ε$-Z)-L-lysine, 200 ml. of dioxane, 14.7 ml. of triethylamine and 30.5 g. of 1-bromohexadecane are heated under reflux at 95–100° for 20 hours. The separated triethylamine hydrobromide is filtered off under suction, the filtrate evaporated in vacuo, the residue taken up in ethyl acetate and the ethyl acetate extract washed neutral with 1 N hydrochloric acid, 5% NaCl solution, 1 N ammonia and 5% NaCl solution. After drying over $Na_2SO_4$, the solution is then evaporated in vacuo and the so-obtained $N^α$-Z($N^ε$-Z)-L-lysine-n-hexadecyl ester is crystallized from ether/petroleum ether. Melting point 70°–72°, $[α]_D^{20}=-9.0°$ (c.=2 in methanol).

The so-obtained N-protected aminoacid ester is decarbobenzoxylated in glacial acetic acid with 5% palladium/carbon and hydrogen. The catalyst is then separated off, the filtrate evaporated in vacuo, the residue dissolved in 4 N hydrochloric acid/methanol, the so-obtained solution evaporated in vacuo and the residue then mixed with acetone. The so-obtained L-lysine-n-hexadecyl ester dihydrochloride is filtered off under suction, washed with acetone and recrystallized from ethanol. Melting point 108°–110° (decomposition); $[α]_D^{20}=+6.9°$ (c.=2 in methanol).

Example 2

18.2 g. of cetyl alcohol, 14.25 g. of p-toluenesulfonic acid monohydrate, 9.1 g. of L-lysine monohydrochloride and 200 ml. of benzene are boiled at reflux for 20 hours. The water which forms is continuously removed with a water-separator. The reaction mixture is evaporated in vacuo. The residue is extracted with a mixture of water and ethyl acetate for the purpose of removing the excess cetyl alcohol, the aqueous phase is then adjusted to a pH of 9–10, extracted with ethyl acetate, the ethyl acetate solution dried over $Na_2SO_4$ and evaporated. The residual oil is neutralized with 1 N HCl/methanol, the solution evaporated, the residue mixed with acetone and the crystal-paste filtered off under suction. Finally, the so-obtained L-lysine-n-hexadecyl ester-dihydrochloride is recrystallized from ethanol. Melting point 108°–110° (decomposition);$[α]_D^{20}=+6.9°$ (c.=2 in methanol).

Example 3

29.8 g. of n-eicosanol, 200 ml. of absolute tetrahydrofuran and 115 mg. of powdered sodium are boiled under reflux for 3 hours under a calcium chloride trap. The n-eicosanol/Na-n-eicosanolate mixture is then decanted off from the remaining small amount of sodium. Meanwhile, 41.4 g. of $N^\alpha$-Z-($N^\epsilon$-Z)-L-lysine are dissolved in 200 ml. of tetrahydrofuran, cooled down to $-10°$, treated with 16.7 g. of carbonyldiimidazole and stirred for one hour at $-10°$. Then the above n-eicosanol/Na-n-eicosanolate mixture is added dropwise at a temperature of $0°$ while stirring. The mixture is stirred for 30 minutes at $0°$ and then for a further 24 hours at $20°$. The resultant solution is then evaporated in vacuo. The residue is dissolved in ethyl acetate, washed neutral with 1 N hydrochloric acid, 5% NaCl solution, 1 N ammonia and 5% NaCl solution, dried over $Na_2SO_4$, evaporated and the so-obtained residue crystallized from ether/petroleum ether. The so-obtained N-protected amino acid ester [$N^\alpha$-Z-($N^\epsilon$-Z)-L-lysine-n-eicosyl ester] is hydrogenolyzed in glacial acetic acid with 5% palladium/carbon and hydrogen gas. The catalyst is then separated off, the filtrate evaporated in vacuo, the residue dissolved in 4 N HCl/methanol, and again evaporated in vacuo, and the residue is then mixed with acetone. The so-obtained L-lysine-n-eicosyl ester dihydrochloride is filtered off under suction and precipitated several times from methanol with the dropwise addition of ethyl acetate. Melting point $107°–109°$; $[\alpha]_D^{20} = +7.0°$ (c.=2 in methanol).

Example 4

The following compounds can be manufactured according to the esterification method described in the foregoing examples:

| | Melting point (decomposition) (deg.) | $[\alpha]_D^{20}$ (c.=2 in methanol) (deg.) |
|---|---|---|
| L-lysine n-decyl ester tartrate | From 130 | +23 |
| L-lysine n-dodecyl ester dihydrochloride | 101–103 | +8.3 |
| L-lysine n-tetradecyl ester dihydrochloride | 91–93 | +9.2 |
| L-lysine n-octadecyl ester dihydrochloride | 105–107 | +6.8 |
| DL-lysine n-hexadecyl ester dihydrochloride | 100–102 | |

Example 5

23 g. of $N^\alpha$-Z-($N^\epsilon$-Z)-L-lysyl-($N^\epsilon$-Z)-L-lysine is reacted according to the procedure of Example 1 with 11.4 g. of 1-bromohexadecane in the presence of 100 ml. of dioxane and 5.2 ml. of triethylamine. The so-obtained N-protected dipeptide ester [$N^\alpha$-Z-($N^\epsilon$-Z)-L-lysyl-($N^\epsilon$-Z)-L-lysine n-hexadecyl ester] is recrystallized several times from acetic ester/petroleum ether [melting point $100–102°$] and then decarbobenzoxylated by hydrogenation in glacial acetic acid using 5% palladium/carbon. After separation of the catalyst, the glacial acetic acid is distilled off, the residue evaporated with 4 N HCl/methanol and precipitated several times from ethanol/acetone. The thus obtained L-lysyl-L-lysine n-hexadecyl ester trihydrochloride melts at $234°$ (decomposition); $[\alpha]_D^{20} = +3°$ (c.=2 in methanol).

Example 6

19 g. of ($N^\epsilon$-Z)-L-lysine n-hexadecyl ester and 11.3 g. of Z-L-phenylalanine are dissolved in 50 ml. of dimethylformamide, the solution cooled down to $-10°$, treated with 7.7 g. of dicyclohexylcarbodiimide, and then left to stand at $0°$ for 20 hours. The reaction mixture, which completely solidifies, is liquified by a short heating, rapidly cooled down and the resulting dicyclohexyl-urea separated off by filtration. The filtrate is then precipitated in 1 N hydrochloric acid, reprecipitated from dimethylformamide/1 N ammonia, filtered under suction and dried. The so-obtained crude N-protected dipeptide ester [Z-L-phenylalanyl - ($N^\epsilon$-Z)-L-lysyl-n-hexadecyl ester] is recrystallized from ethanol and decarbobenzoxylated by hydrogenation in 33% HBr/glacial acetic acid for 3 hours under a calcium chloride trap. The so-obtained L-phenylalanyl-1-lysine n-hexadecyl ester dihydrobromide is precipitated with absolute ether, filtered off under suction, washed with ether, dried and recrystallized from ethanol. Melting point $145°–147°$, $[\alpha]_D^{20} = -3°$ (c.=2 in methanol).

The ($N^\epsilon$-Z)-L-lysine-n-hexadecyl ester used as the starting material can be obtained as follows:

61.6 g. of $N^\alpha$-formyl-($N^\epsilon$-Z)-L-lysine, 200 ml. of dioxane, 29 ml. of triethylamine and 61 g. of 1-bromohexadecane are heated under reflux at $95–100°$ for 20 hours. The triethylamine hydrobromide is filtered off under suction, the filtrate evaporated in vacuo, the residue, in ethyl acetate, washed neutral with 10% acetic acid, 5% NaCl solution, 1 N ammonia and 5% NaCl solution, dried over $Na_2SO_4$, evaporated and crystallized from ethanol. The so-obtained $N^\alpha$-formyl-($N^\epsilon$-Z)-L-lysine n-hexadecyl ester melts at $86–88°$.

This N-protected amino acid ester is deformylated by standing for 16 hours in 2 N HCl/methanol, after which the solution is evaporated and the residue then crystallized from methanol/ether. The so-obtained ($N^\epsilon$-Z)-L-lysine n-hexadecyl ester hydrochloride melts at $88–90°$; $[\alpha]_D^{20} = +6.5°$ (c.=2 in methanol).

The free ester-base is obtained by partitioning the hydrochloride between chloroform and ammonia, washing the chloroform phase with water, drying over $Na_2SO_4$ and concentrating in vacuo. The free ($N^\epsilon$-Z)-L-lysine n-hexadecyl ester then separates as an oil which solidifies upon cooling.

Example 7

6.8 g. of L-phenylalanine n-hexadecyl ester and 7.2 g. of $N^\alpha$-Z-($N^\epsilon$-Z)-L-lysine are dissolved in 40 ml. of dimethylformamide, treated at $0°$ with 3.55 g. of dicyclohexylcarbodiimide and left to stand for 20 hours at $0°$. The solid mass is heated for a short period of time until liquification occurs, rapidly cooled down, and the dicyclohexyl-urea filtered off under suction. The filtrate is then diluted with ethyl acetate, washed neutral with 1 N hydrochloric acid, 5% NaCl solution, 1 N ammonia and 5% NaCl solution, dried over $Na_2SO_4$, evaporated and the residue crystallized from ethyl acetate/petroleum ether. The so-obtained N-protected dipeptide ester is decarbobenzoxylated by hydrogenation in glacial acetic acid in the presence of 5% palladium/carbon, the catalyst separated off, the filtrate evaporated, the residue evaporated with 4 N HCl/methanol and mixed with acetone. The so-obtained L - lysyl-L-phenylalanine n-hexadecyl ester dihydrochloride is filtered off under suction and recrystallized from ethanol. Melting point $160–162°$; $[\alpha]_D^{20} = +20.4°$ (c.=2 in methanol).

Example 8

23 g. of $N^\alpha$-formyl-($N^\gamma$-Z)-L-$\alpha,\gamma$-diaminobutyric acid n-hexadecyl ester (melting point $89–91°$; $[\alpha]_D^{23} = -12.1$; c.=2 in methanol) is decarbobenzoxylated by hydrogenation in glacial acetic acid with 5% palladium/carbon. The catalyst is then filtered off under suction, the filtrate evaporated in vacuo, the residue shaken out with water, ethyl acetate and excess ammonia, the ethyl acetate phase washed with water, dried over $Na_2SO_4$ and evaporated in vacuo. There is thus obtained, $N^\alpha$-formyl-L-$\alpha,\gamma$-diaminobutyric acid n-hexadecyl ester as a viscous oil which crystallizes upon cooling.

A solution of 15 g. of this n-hexadecyl ester and 15.7 g. of $N^\alpha$-Z-($N^\gamma$-Z)-D-$\alpha,\gamma$-diaminobutyric acid in 70 ml. of dimethylformamide is treated at $0°$ with a solution of 8.4 g. of dicyclohexylcarbodiimide and left to stand for 20 hours at $0°$. Then the separated dicyclohexyl-urea is filtered off under suction, the filtrate diluted with 500 ml. of ethyl acetate, washed neutral with 1 N acetic acid, water and 1 N ammonia, and the ethyl acetate solution dried over $Na_2SO_4$ and thereafter evaporated in vacuo. The so-obtained $N^\alpha$ - formyl - $N^\gamma$-[$N^\alpha$-Z($N^\gamma$-Z)-D-$\alpha,\gamma$-diaminobutyryl] - L - $\alpha,\gamma$-diaminobutyric acid n-hexadecyl ester is crystalized from ethyl acetate/petroleum ether. Melting point 114–116° $[\alpha]_D^{20}=-6.9°$ (c.=2 in dimethylformamide).

5 g. of the so-obtained N-protected dipeptide n-hexadecyl ester is decarbobenzoxylated by hydrogenation in glacial acetic acid in the presence of 5% palladium/carbon. The catalyst is then filtered off under suction, the filtrate evaporated in vacuo and the residue deformylated with 30 ml. of 4 N HCl/methanol for 5 hours at 20°. The solution is then evaporated in vacuo, the residue mixed with acetone, filtered off under suction, reprecipitated from methanol/acetone and methanol/ethyl acetate and dried in vacuo at 60°. The so-obtained $N^\gamma$ - (D-$\alpha$-$\gamma$-diaminobutyryl) - L-$\alpha,\gamma$-diaminobutyric acid n-hexadecyl ester trihydrochloride melts at 190–193° (decomposition); $[\alpha]_D^{20}=-15.7°$ (c.=3 in methanol).

Example 9

32 g. of $N^\alpha$-formyl-($N^\epsilon$-Z)-L-lysine-n-hexadecyl ester are decarbobenzoxylated by hydrogenation in glacial acetic acid with palladium/carbon. The catalyst is then filtered off under suction, the filtrate evaporated in vacuo, the residue dissolved in a mixture of water and ethyl acetate, the solution adjusted to a pH of 9–10 with concentrated ammonia, then extracted with ethyl acetate, the ethyl acetate extract dried over $Na_2SO_4$ and evaporated in vacuo. The $N^\alpha$-formyl-L-lysine n-hexadecyl ester obtained as the residue solidifies upon cooling.

22 g. of the so-obtained aminoacid hexadecyl ester and 22.9 g. of $N^\alpha$-Z-($N^\epsilon$-Z)-L-lysine are dissolved in 50 ml. of dimethylformamide, treated at 0° with a solution of 11.3 g. of dicyclohexylcarbodiimide and left to stand for 24 hours at 0°. The resultant thick gel is liquified by heating, then the dicyclohexyl-urea is filtered off under suction and the filtrate precipitated in 1 N acetic acid. The precipitate is filtered off under suction, and is reprecipitated from dimethylformamide/1 N ammonia. The so-obtained $N^\alpha$-formyl-$N^\epsilon$-[$N^\alpha$-Z-($N^\epsilon$-Z)-L-lysyl]-L-lysine n-hexadecyl ester is filtered off under suction, washed with water, dried in vacuo and recrystallized from ethyl acetate/petroleum ether. Melting point 102–104°;

$$[\alpha]_D^{23}=-10.2°$$

(c.=2 in methanol).

15 g. of the dipeptide hexadecyl ester thus obtained, is decarbobenzoxylated by hydrogenation in glacial acid with palladium/carbon. The catalyst is then filtered off under suction, the filtrate evaporated in vacuo and the residue deformylated with 100 ml. of 2 N HCl/methanol for 5 hours at 20°. Upon evaporation there results a crystalline residue which is recrystallized from ethanol, yielding $N^\epsilon$-L-lysyl-L-lysine n-hexadecyl ester trihydrochloride which melts at 220–222° (decomposition); $[\alpha]_D^{23}=+18.9°$ (c.=2 in methanol).

Example 10

9 g. of Z-D-serine and 19 g. of ($N^\epsilon$-Z)-L-lysine n-hexadecyl ester are dissolved in 70 ml. of dimethylformamide and cooled down to −10°, then treated with 7.7 g. of dicyclohexylcarbodiimide and left to stand for 20 hours at 0°. The solid mass is heated for a short period until liquification occurs, rapidly cooled down and separated from the dicyclohexyl-urea by filtration under suction. The filtrate is precipitated in 1 N hydrochloric acid and re-precipitated from dimethylformamide/1 N ammonia. After drying, the Z-D-seryl-($N^\epsilon$-Z)-L-lysine n-hexadecyl ester obtained is crystallized from ethanol. This N-protected dipeptide ester obtained is then decarbobenzoxylated by hydrogenation in glacial acetic acid with 5% palladium/carbon. The catalyst is separated off, the filtrate evaporated and the residue evaporated with 4 N HCl/ethanol. The so-obtained D-seryl-L-lysine n-hexadecyl ester dihydrochloride is mixed with acetone, left to stand for 3 hours at 0°, filtered off under suction and crystallized from ethanol. Melting point 120°; $[\alpha]_D^{20}=-15°$ (c.=2 in methanol).

Example 11

17 g. of L-lysine n-hexadecyl ester and 34.6 g. of $N^\alpha$-Z-($N^\epsilon$-Z)-L-lysine are dissolved in 150 ml. of dimethylformamide, treated at −10° with 17 g. of dicyclohexylcarbodiimide and left to stand for 24 hours at 0°. The resultant thick oil is liquified by heating, rapidly cooled down and freed from dicyclohexyl-urea by filtration under suction. The filtrate is diluted with 800 ml. of ethyl acetate and washed neutral with 1 N hydrochloric acid, water, 1 N ammonia and water. After drying over $Na_2SO_4$, the ethyl acetate is distilled off in vacuo and the residue recrystallized, first from ethanol, then from methanol. The thus-obtained N-protected $N^\alpha$-Z-($N^\epsilon$-Z)-di-L-lysyl-L-lysine n-hexadecyl ester melts at 131–132°.

This N-protected tripeptide ester is decarbobenzoxylated by hydrogenation in glacial acetic acid with 5% palladium/carbon, the catalyst is separated off and the ethyl acetate is distilled off in vacuo. The residue is then evaporated with 4 N HCl/methanol in vacuo, mixed with acetone, filtered off under suction, dried and reprecipitated several times from ethanol/acetone. The so-obtained $N^\alpha$-L-lysyl-($N^\epsilon$-L-lysyl) - L - lysine n-hexadecyl ester tetrahydrochloride melts at 240° (decomposition); $[\alpha]_D^{20}=+12.9°$ (c.=2 in methanol).

Example 12

20.9 g. of $N^\alpha$-Z-($N^\epsilon$-Z)-L-lysyl-($N^\epsilon$-Z) - L - lysine hydrazide is dissolved in 120 ml. of 80% acetic acid and 13 ml. of concentrated hydrochloric acid. The solution is then treated with 150 ml. of ethyl acetate and cooled down to −10°. At this temperature a solution of 2.2 g. of sodium nitrite in 10 ml. of water is added dropwise to the reaction mixture with stirring, the azide extracted after 20 minutes at 0° with 150 ml. of ethyl acetate, the ethyl acetate extract is washed with water, 1 N sodium bicarbonate solution and dried at 0° over sodium sulfate. The azide solution, which is still acidic, is treated portionwise at 0° while stirring with a solution of 15.6 g. of ($N^\epsilon$-Z)-L-lysine hexadecyl ester in 50 ml. of ethyl acetate and left to stand for 48 hours at 0°. The so-obtained N-protected tripeptide ester, [$N^\alpha$-Z($N^\epsilon$-Z)-L-lysyl-($N^\epsilon$-Z)-L-lysyl-($N^\epsilon$-Z)-L-lysine n-hexadecyl ester], is filtered off under suction, washed with ether, precipitated from dimethylformamide in 1 N hydrochloric acid and reprecipitated from dimethylformamide/1 N ammonia, filtered off under suction, dried and recrystallized from dimethylformamide/ethanol. Melting point 151–153°;

$$[\alpha]_D^{20}=-8.3°$$

(c.=2 in dimethylformamide).

15 g. of the so-obtained N-protected tripeptide ester is decarbobenzoxylated by hydrogenation in glacial acetic acid with palladium/carbon. The catalyst is then separated off, and the filtrate evaporated in vacuo. The residue is dissolved with 60 ml. of 4 N HCl/methanol, immediately evaporated in vacuo, then mixed with acetone, filtered off under suction and reprecipitated several times from methanol/ethyl acetate. There is thus obtained the L-lysyl-L-lysyl-L-lysine n - hexadecyl ester tetrahydrochloride, melting point 275° (decomposition).

Example 13

The amino acid esters obtained according to the methods of this invention can be converted into various application-forms. It is especially advantageous for this purpose to use the amino acid esters in the form of their water soluble acid addition salts, e.g. hydrochlorides. Suitable application-forms are, for example—

(a) Aqueous solution (0.05; 0.1; 1%):
  Active material, 0.05 or 0.1 or 1 g.
  Distilled water, ad. 100 ml.

(b) Tincture (0.05 or 1%):
   Active material, 0.05 or 1 g.
   Distilled water, 2 ml.
   Ethanol (94%), ad. 100 ml.
(c) Mucilage-salve:
   Active material, 0.1 g.
   Methylcellulose, 1.2 g.
   Distilled water, ad. 100.0 g.

I claim:
1. A compound selected from the group consisting of L-lysyl-L-lysine n-hexadecyl ester and pharmaceutically acceptable acid-addition salts thereof.
2. A compound selected from the group consisting of $N^\epsilon$-L-lysyl-L-lysine n-hexadecyl ester and pharmaceutically acceptable acid-addition salts thereof.
3. A compound selected from the group consisting of L-lysyl-L-lysyl-L-lysine n-hexadecyl ester and pharmaceutically acceptable acid-addition salts thereof.
4. A compound selected from the group consisting of $N^\alpha$-L-lysyl-($N^\epsilon$-L-lysyl)-L-lysine n-hexadecyl ester and pharmaceutically acceptable acid-addition salts thereof.
5. A compound selected from the group consisting of L-lysyl-L-lysine n-hexadecyl ester, $N^\epsilon$-L-lysyl-L-lysine n-hexadecyl ester, L-lysyl-L-lysyl-L-lysine n-hexadecyl ester and $N^\alpha$-L-lysyl-($N^\epsilon$-L-lysyl)-L-lysine n-hexadecyl ester, wherein the nitrogen of at least one amino group not partaking in a peptide linkage is substituted by a moiety selected from the group consisting of carbobenzoxy, tosyl, phthalyl, trityl, formyl, trifluoroacetyl and tert-butyloxycarbonyl.

References Cited

UNITED STATES PATENTS

| | | | |
|---|---|---|---|
| 3,281,378 | 10/1966 | Garber et al. | 260—2.5 |
| 2,063,987 | 12/1936 | Dreyfus | 260—99.12 |
| 2,290,174 | 7/1942 | Epstein et al. | 167—22 |
| 3,215,684 | 11/1965 | Strojny et al. | 260—112 |
| 2,932,635 | 4/1960 | Amiard et al. | 260—112 |
| 3,004,021 | 10/1961 | Selle et al. | 260—123.7 |

OTHER REFERENCES

Bichowsky-Slomnicki et al., Arch Biochim. Biophys. 65, 400–431 (1956). (Copy in P.O.S.L.)

LEWIS GOTTS, *Primary Examiner.*

M. M. KASSENOFF, *Assistant Examiner.*

U.S. Cl. X.R.

21—58; 260—309, 482; 424—177, 273, 311

UNITED STATES PATENT OFFICE
CERTIFICATE OF CORRECTION

Patent No. 3,433,779

March 18, 1969

Karl Vogler

It is certified that error appears in the above identified patent and that said Letters Patent are hereby corrected as shown below:

Column 2, line 59, "$N^\alpha$-L-arginyl-L-arginine-n-hexadecyl ester" should read -- $N^\alpha$-L-arginyl-L-arginine-n-decyl ester --. Column 4, line 72, "oxide" should read -- azide --. Column 9, line 49, "glacial acid" should read -- glacial acetic acid --.

Signed and sealed this 14th day of April 1970.

(SEAL)
Attest:

Edward M. Fletcher, Jr.

Attesting Officer

WILLIAM E. SCHUYLER, JR.

Commissioner of Patents